United States Patent [19]

Marrian et al.

[11] Patent Number: 5,113,367
[45] Date of Patent: May 12, 1992

[54] CROSS ENTROPY DECONVOLVER CIRCUIT ADAPTABLE TO CHANGING CONVOLUTION FUNCTIONS

[75] Inventors: Christie R. K. Marrian, Marbury; Martin C. Peckerar, Silver Spring, both of Md.

[73] Assignee: The United States of America as represented by the Secretary of the Navy, Washington, D.C.

[21] Appl. No.: 472,936

[22] Filed: Jan. 31, 1990

Related U.S. Application Data

[63] Continuation-in-part of Ser. No. 374,815, Jul. 3, 1989, abandoned.

[51] Int. Cl.⁵ .......................... G06G 7/19; G06G 9/00
[52] U.S. Cl. ..................... 364/819; 364/807; 395/21
[58] Field of Search ................. 364/807, 819, 513; 307/201

[56] References Cited

U.S. PATENT DOCUMENTS

| | | | |
|---|---|---|---|
| 4,719,591 | 1/1988 | Hopfield et al. | 364/807 |
| 4,731,747 | 3/1988 | Denker | 364/513 |
| 4,737,929 | 4/1988 | Denker | 364/807 |
| 4,755,963 | 7/1988 | Denker et al. | 364/807 |
| 4,773,024 | 9/1988 | Faggin et al. | 365/513 |
| 4,849,925 | 7/1989 | Peckernar et al. | 364/819 |
| 4,901,271 | 2/1990 | Graf | 364/807 |

OTHER PUBLICATIONS

Michael Peter Kennedy et al., "Circuit Theoretic Solutions for Neural Networks", Jun. 21–24, 1987.
Electronic "Neural" Net Algorithm for Maximum Entropy Solutions of Ill-Posed Problems, by Christie R. K. Marrian and Martin C. Peckerar, IEEE Transactions on Circuits and Systems, vol. 36, No. 2, Feb. 1989.

*Primary Examiner*—Jerry Smith
*Assistant Examiner*—Jim Trammel
*Attorney, Agent, or Firm*—Thomas E. McDonnell; Edward F. Miles

[57] ABSTRACT

A neural net, and method of using the net, to solve ill-posed problems, such as deconvolution in the presence of noise. The net is of the Tank-Hopfield kind, in which input to the signal net is a cross entropy regularizer.

5 Claims, 7 Drawing Sheets

□ BLURRED NOISY IMAGE, S/N 46
+ RECONSTRUCTION
× OBJECT
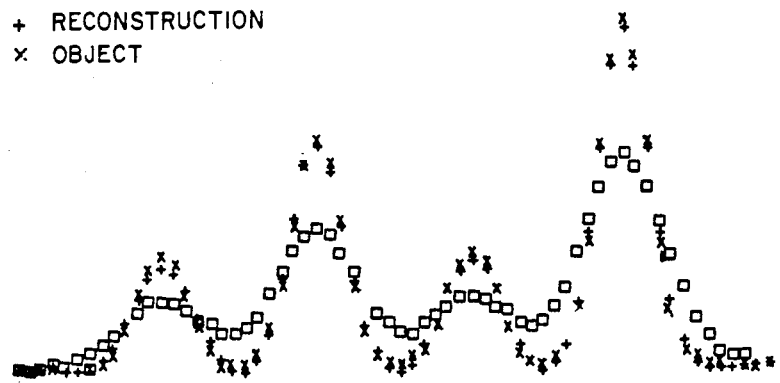
FIG. 4(a)
|  | σ, object pixels | σ, blurring pixels | signal noise | K, gain |
|---|---|---|---|---|
| FIG. 4 | 3 | 4 | 46 | 3 |
| FIG. 6 | 3 | 4 | 0.9 | 0.1 |
FIG. 4(b)
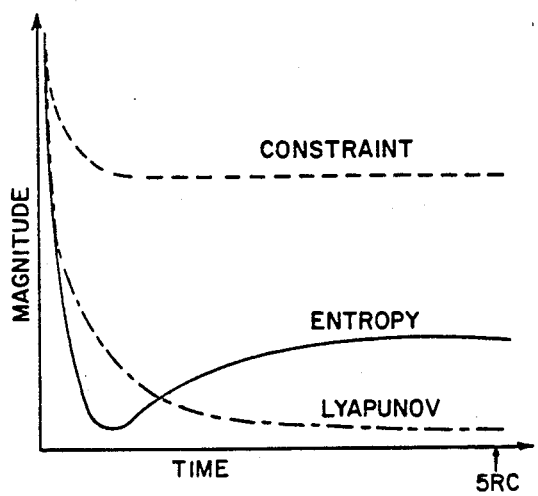
FIG. 5

CROSS ENTROPY DECONVOLVER CIRCUIT ADAPTABLE TO CHANGING CONVOLUTION FUNCTIONS

This is a continuation in part of application Ser. No. 07/374,851, now abandoned.

BACKGROUND OF THE INVENTION

A problem is considered ill-posed if there is insufficient information available to achieve a unique solution. In general, a deconvolution problem can be termed ill-posed if there are any singularities in the transfer function or if the observation data to be deconvolved are corrupted by noise. This is often the case in signal processing related to spectroscopy and imperfect imaging systems. The goal of the signal processing is to reconstruct the original object, i.e., to deconvolve the observations and to cancel noise. In other words, the problem is to invert equation (1), below, to find the unknown object O from the known convolution function T and known observation data I:

$$I = O*T \qquad (1)$$

where * represents the convolution operation.

Numerous methods exist for such a deconvolution which can readily be implemented on a digital computer. A simple example is that of Fourier deconvolution. As convolution can be expressed as the product of the transforms of the object and the transfer function, the transform of the object can be found by dividing the transform of the observations by that of the transfer function. However, this approach breaks down when there is noise present in the observations or the transfer function transform has zeros. In such cases the deconvolution can be solved by using a "regularizer" which is a function of successive estimates made of the object. The technique is iterative in nature as the successive estimates O are convolved and compared to the observation, I. One then minimizes $$|O*T - I|^2 + |G(O)|$$

where G(O) is the regularizer. The regularizer is best chosen to reflect an important characteristic of the specific problem at hand. The problem, however, remains as to the best choice for regularizer in the absence of specific prior knowledge of the object being reconstructed.

The technique of maximum entropy is often described as the preferred method of recreating a positive distribution, i.e., containing only nonnegative values, with well-defined moments from incomplete data. Maximum entropy has been demonstrated to be extremely powerful in several fields such as optical image enhancement, deconvolution, spectral analysis and diffraction tomography. The essence of the maximum entropy method is to maximize the entropy of the reconstructed distribution subject to satisfying constraints on the distribution. These constraints are often defined by a set of observations such as, for example, a moment (e.g., average) or convolution (e.g., blurred image) of the true distribution. Thus entropy is a meaningful choice for a regularizer when the only specific knowledge about the object being reconstructed is positivity. Furthermore, the regularized reconstructions have error term distributions that are of the exponential family. That is, they have well-defined means and variances, which is what one would expect from a real physical system. In contrast least squares estimates do not assure this.

Maximum entropy methods are computationally intensive and require at least a minicomputer and the necessary software. As a result it is difficult to achieve a maximum entropy deconvolution, for example, in real time which would be of great use in many applications. This type of problem would appear to be suited to computation in a multiply connected or "neural" electronic net. Such a net can be designed so that its operation is characterized by a stability (Lyapunov) function which is a well-defined function of the net parameters (i.e., inputs, outputs, interconnects etc.) (An example of such a net is shown in U.S. Pat. No. 4,849,925 to Peckerar and Marrian, the disclosure of which is incorporated herein by reference. This patent discloses a net of the Tank-Hopfield kind modified to use entropy as a regularizer.) The output from such a net evolves with time until a minimum in its Lyapunov function is reached. By designing a net with specific cost function. Here two nets are interconnected: a signal net (also called a variable plane or variable net) representing the solution which receives input from a constraint net when the solution breaks any of a set of constraints. The combined nets give a solution which minimizes a specific cost function subject to the set of constraints being satisfied.

This specification describes a method suitable for implementation in a multiply connected net which gives maximum entropy solutions to ill-posed problems.

Maximum Entropy Method

Considering the basic definition of informational entropy (hereafter, simply referred to as entropy), various modifications to the Shannon entropy have been proposed. Of particular interest is the cross entropy. Here the entropy, S, of a distribution $O_i$, $i=1$ to $N_s$ is given by $$S = \Sigma_i O_i - \Sigma_i M_i - \Sigma_i O_i log(O_i/M_i) \qquad (2)$$

where $M_i$, $i=1$ to $N_s$ is a prior estimate of $O_i$. This function is always negative and has a maximum value of zero when $O_i = M_i$. With $M_i = 1_{N_s}$ for all i, reflecting the absence of prior knowledge, the expression for S behaves as the Shannon entropy, i.e.

$$\Sigma_i - O_i log(O_i) \text{ with } \Sigma_i O_i = 1.$$

Although the absolute values of the two entropy expressions differ, they vary in a similar fashion with $O_i$. That is, the Shannon entropy is also a maximum, log $(N_s)$ when the $O_i$'s are equal, $1/N_s$. The entropy can be considered as a measure of the randomness of the distribution and a maximum entropy distribution is often described as the "maximally noncommittal distribution." For the case where all the $M_i$'s are equal, maximizing the entropy, as defined in (2), of the distribution $O_i$ smoothes it and normalizes it to $\Sigma_i M_i$.

The output $O_i$ from the method is prevented from reaching the maximum entropy conditions, $O_i = M_i$ for all i, by the constraints defined by the observation data $I_j$, $j=1$ to $N_c$. For cases where there is a linear relationship between the observation data and the desired output, one can write $$I_j = \Sigma_i O_i T_{ij} + \epsilon_j \qquad (3)$$

where $\epsilon_j$ represents noise corruption of $I_j$ and the $T_{ij}$'s represent a transfer function, for example. In general the problem of determining the distribution $O_i$ will be ill-posed if $N_c < N_s$ or if the distribution $\epsilon_j$ is nonzero assuming the $T_{ij}$ matrix has finite elements. The method must minimize the amount that the convolved output differs from the observations, i.e.

$$\Sigma_j(\Sigma_i O_i T_{ij} - I_j)^2 \quad (4)$$

must be minimized.

The expression (4) is proportional to the logarithm of the likelihood function of the distribution $O_i$ if the noise distribution can be considered Gaussian in form. This specification describes this quantity as representing a quantitative expression of the degree of constraint breaking rather than the likelihood because it is related to what we define as the constraint part of the net described in the next section. (Note that we define i and k to be indexed between 1 and $N_s$, the solution space, and j between 1 and $N_c$, the constraint space. Summations are defined as taking place over these same ranges.)

The method is illustrated for a deconvolution problem in the flowchart in FIG. 1. During each iteration, the outputs O are convolved with the system transfer function T (reference numeral 10) and compared (12) with the constraints which are simply the observation data I. A gradient search is performed (14) as the outputs are adjusted (16) to reduce any constraint breaking and/or increase the entropy. As the reconstruction progresses and the constrains become closely satisfied, the role of the regularizer becomes increasingly important part of the method stability function. The reconstruction is complete when the outputs stabilize.

SUMMARY OF THE INVENTION

Accordingly, an object of the invention is to provide a neural net circuit which uses a cross entropy regularizer to minimize equation (4).

More broadly, another object is to permit the solution of ill-posed deconvolutions, in particular:

To deconvolute data in the presence of noise.

To reconstruct a best estimate of such noise.

To deconvolute data despite singularities in the transfer function which produces the data.

To deconvolute such data despite time variation in the transfer function which produces the data.

Another object is to do the foregoing speedily, in real time.

Another object is to use a plurality of such neural nets to perform deconvolutions on data generated by a time varying transfer function, while simultaneously updating the values of the transfer function.

In accordance with these and other objects made apparent hereinafter, the invention concerns an adaptation of the Tank-Hopfield neural network. The circuit is in the form of a signal net and a constraint net, highly interconnected in a well-known manner. The N legs of the constraint net receive as inputs the elements of data vector I, which has elements $I_j$, j=1 to $N_c$; the $N_s$ legs of the signal net receive as inputs $(1/R)\log(M_i)$, i=1 to $N_s$, where R is the shunt resistance of each input leg. If the transfer function of each signal leg is exponential, then the stability function of the circuit becomes $$E = (K/2)\Sigma_j(\Sigma_K O_k T_{kj} - I_j)^2 + (1/R)\Sigma_i[O_i \log(O_i/M_i) - O_i]$$

Where $O_i$ is the output of the ith leg of the signal net, and $T_{ij}$ is the feedback transconductance between leg i and j of the signal and constraint nets, respectively, and k is an index from 1 to $N_s$. (Using k, rather than i, as an index in the left hand term emphasizes that the summations associated with these indices are independent of one another.) The left hand term of E is in the form of equation (4), and the right hand term in the form of the cross entropy between data vectors O and M. If I represents a data set to be deconvolved, (e.g. one corrupted by noise), and M represents a prior estimate of O, as the circuit evolves to a global minimum in E the $O_i$'s come to represent the best estimate of the deconvolution of I, using the cross entropy of O and M as a regularizer.

As discussed above, the left hand term is a measure of the difference between the output and the convoluted input. Minimizing it thus optimizes the estimate of the deconvolution. The right hand term is a measure of the cross entropy of the data vectors whose elements are $M_i$ and $O_j$. This cross entropy is thus the regularizer under which the left hand term is optimized. If the $I_j$'s are sampled data, e.g. from a spectrometer, and the $M_i$'s are prior estimates of these data, the circuit optimizes the estimate (the $O_i$'s) of the deconvolution of the circuit input (the $I_j$'s), with this optimization biased towards the prior estimates. In this manner, the circuit improves the estimate by employing prior knowledge of the data.

The invention is more fully appreciated from the following detailed description of the preferred embodiment, it being understood, however, that the invention is capable of extended application beyond the precise details of the preferred embodiment. Changes and modifications can be made that do not affect the spirit of the invention, nor exceed its scope, as expressed in the appended claims. Accordingly, the invention is described with particular reference to the accompanying drawings, wherein:

BRIEF DESCRIPTION OF THE DRAWINGS

FIG. 4 shows the results of a computer simulation of such a neural net deconvolving spectrometer data blurred by noise. FIG. 4(a) is a graph showing the raw data and its reconstruction by the simulation; FIG. 4(b) a table of parameters which define the gaussian noise used to generate the data of FIG. 4(a).

FIG. 5 is a graph of the time evolution of the terms of the stability function for the net simulation similar to that of FIG. 4.

DETAILED DESCRIPTION

The net is required to minimize a cost function which contains a term related to the constraint violation (4) (which must be minimized) and one proportional to the entropy (2) (which must be maximized). So the cost function, E, should be of the form $$E = [\text{Constraint Term}] - [\text{Entropy Term}].$$

Therefore, the Lyapunov (stability) function for the net must be defined so that E is minimized. As suggested above, we will use the observations $I_j$ as $N_c$ constraints of the form described in (3) and modify the $O_i$'s as follows:

if $\Sigma_i O_i T_{ij} - I_j > 0$, then $O_i$'s must be reduced whereas if $\Sigma_i O_i T_{ij} - I_j < 0$, then the $O_i$'s must be increased.

Figure 1:
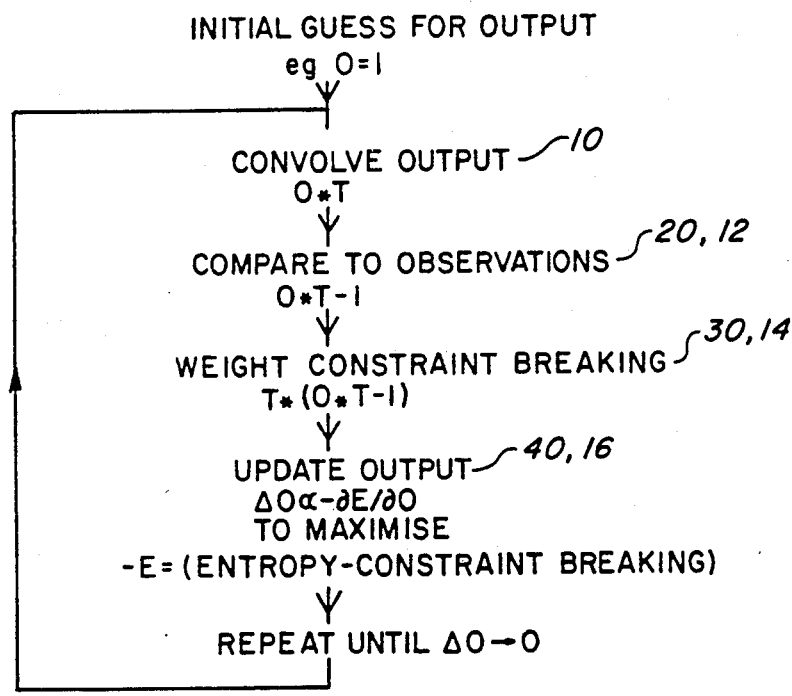
FIG. 1 is a schematic flowchart for maximum entropy deconvolution.
Figure 2:
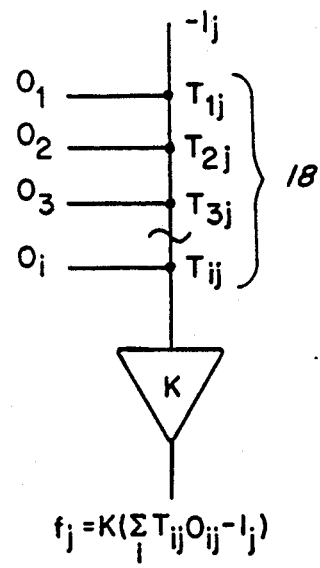
FIG. 2 is a schematic of a circuit node for performing the operation $\Sigma_i O_i T_{ij} - I_j$.

The appropriate response can be obtained from a series of constraint nodes shown schematically in FIG. 2. Each node 18 is a transresistance amplifier having a linear characteristic, so that the output voltage $f_j$ is a constant K times the total input current. So letting the $T_{ij}$'s define conductances and applying the constrain $I_j$ as a negative current input. The node output can then be written $$f_j = K(\Sigma_i O_i T_{ij} - I_j).$$

In general K may be different for each node, for simplicity it is considered to the same for each node. Solving equation (3) for $\epsilon_j$, the noise term, one gets $$\epsilon_j = -(\Sigma_i O_i T_{ij} - I_j)$$

Substituting this expression into the equation for $f_j$, $$f_j = K(\Sigma_i O_i T_{ij} - I_j) = \epsilon_j$$

Thus the outputs $f_j$ of the constraint net represent the noise corruption of the $I_j$'s.

If the outputs of the constraint nodes are fed back into the inputs of the signal nodes with the same weights but of the opposite sign, the circuit will adjust the $O_i$'s in the appropriate sense. The net, therefore, consists of a series of $N_c$ constraint nodes interconnected with $N_s$ signal nodes. The output from signal node i is connected to the input of constraint node j with a weight of $T_{ij}$ whereas the output of constraint node j is connected to the input of signal node i with weight $-T_{ij}$. The negative weights can be achieved by simply making the constraint nodes inverting, i.e., they have a gain of $-K$.

However, such a circuit will be unstable. To achieve stability we require that the signal nodes are much slower than the constraint nodes. This can be achieved by simply applying a capacitor between the ground and the input to each signal node, for example. For this type of circuit the Lyapunov (stability) function is derived by summing:

$$\int I dV$$

over all the capacitors in the circuit. (I is the current through, and V the voltage across. each capacitor). It can be shown and that this circuit will follow a Lyapunov function containing the sum of the integrals, $F_j$, of the constraint node characteristics and terms related to the signal nodes.

$F_j$ is given by $$F_j = K/2(\Sigma_i O_i T_{ij} - I_j)^2$$

so $\Sigma F_j$, is proportional to expression (4) and will increase if the constraints are broken in either sense.

The other terms in the Lyapunov function are related to the signal nodes' input-output characteristic, transfer function g, and external current inputs. The contribution of the signal nodes can be written as $$\Sigma_i [(1/R_i) \int g^{-1}(V) dV - A_i O_i] \quad (5)$$

where $g^{-1}$ is the inverse of the signal node characteristic, $R_i$ is the effective resistance shunting the input of each signal node, and $A_i$ is the external current input to signal node i. If g is exponential, its inverse will be logarithmic and the term in (5) containing $g^{-1}$ can be expressed as $$\Sigma_i(1/R_i)[O_i \log(O_i) - O_i]. \quad (6)$$

If the $R_i$'s are made equal, R. the Lyapunov function then has a term related to the negative of the entropy. However, comparing (6) to the expression (3) for the entropy given above, an extra term corresponding to $$-(1/R)\Sigma_i O_i \log(M_i)$$

is required to make the Lyapunov function contain a term that varies with $-S$. Note that the $\Sigma_i M_i$ term can be ignored as it is constant. This can be achieved by setting $A_i$, the external current input, to $[\log(M_i)/R]$ which will add the appropriate term to the Lyapunov function.

Figure 3:
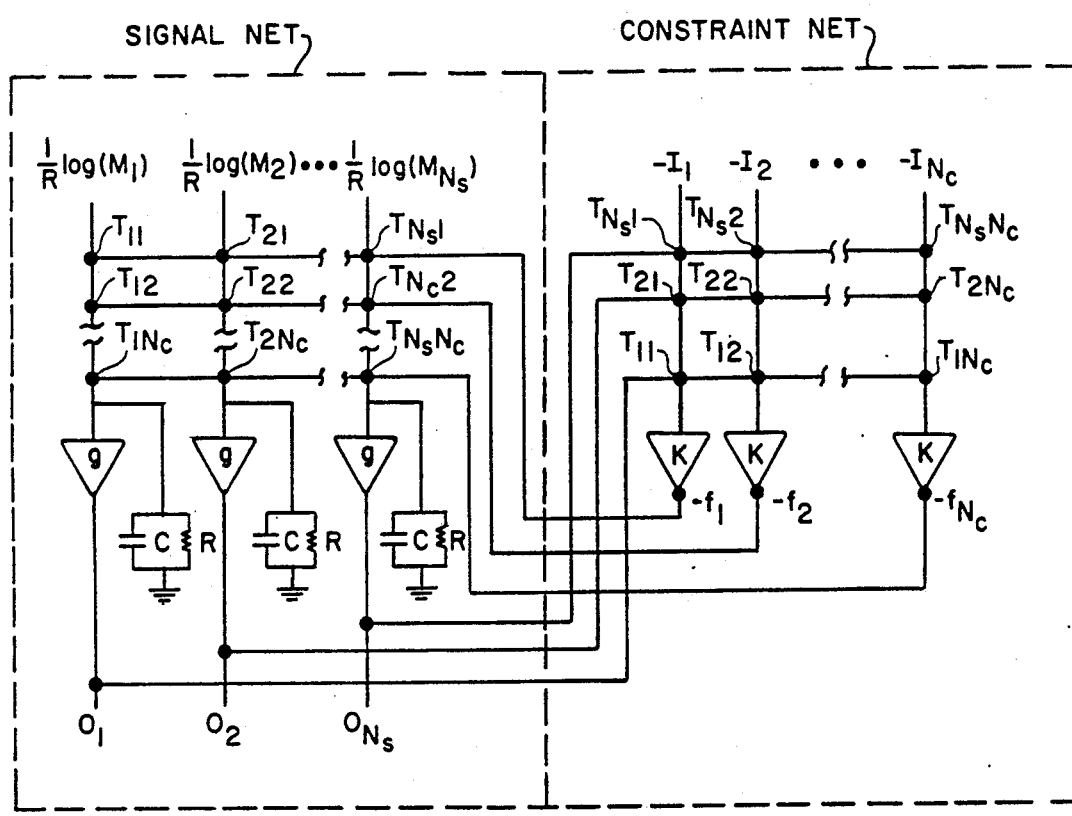
FIG. 3 is a circuit schematic of a maximum entropy neural net, according to the invention.

FIG. 3 shows a neural net similar to that of U.S. Pat. No. 4,849,925. It is in the form of two interconnected nets, called the signal and constraint nets respectively. The signal net has $N_s$ legs each with a transfer function of g. and the constraint net has $N_c$ legs, each with a constant transfer function (gain) K. The circuit of FIG. 3 differs from the basic Tank-Hopfield kind in that the inputs to the signal net legs are $(1/R)\log(M_i)$, the cross entropy of data sets M and O.

The circuit as shown in FIG. 3 then has a stability function given by $$E = K/2\Sigma_j(\Sigma_k O_k T_{kj} - I_j)^2 + (1/R)\Sigma_i [O_i \log(O_i/M_i) - O_i] \quad (7)$$

i.e., of the form of the desired cost function described above. This can be verified to be a Lyapunov function by considering the time derivative of (7).

$$dE/dt = \Sigma_i [K \Sigma_j T_{ij}(\Sigma_k O_k T_{kj} - I_j) + (1/R)\log(O_i/M_i)] \cdot dO_i/dt. \quad (8)$$

The expression in square brackets can be seen to be equal to the negative of the current through the capacitor C shunting each signal node, i.e., $-C du_i/dt$, where $u_i$ (defined as $g^{-1}(O_i)$) is the input to the signal node. Writing $u_i$ as $g^{-1}(O_i)$, (8) becomes $$dE/dt = \Sigma_i[-Cd(g^{-1}(O_i))/dO_i dO_i/dt]dO_i/dt$$
$$= \Sigma_i[-(C/O_i)(dO_i/dt)^2]$$

which as $O_i$'s $> 0$ for all $i$ implies that $dE/dt < 0$ for all $t$. However due to the exponential nature of the signal nodes, positivity is assured so (7) will indeed be a Lyapunov function for the circuit.

It must be emphasized that the description of the development of the Lyapunov function does not place any restrictions on the T matrix as it is defined here. This is in contrast to single plane multiply connected circuits where symmetry ($T_{ij} = T_{ji}$) is required for absolute stability. As a result nonsymmetric convolution functions as would be expected in a real imaging system or spectrometer, can be applied to this circuit. An example with a nonsymmetric and nonsquare T matrix follows. Similarly there is no restriction on I; positive, zero, and negative values are possible. However, the solution for O will, of course, be nonnegative.

EXAMPLE 1

FIG. 4(a) shows the results of a computer simulation of a net of the kind shown in FIG. 3. The simulation was set up as follows. The convolution function was represented by a Gaussian of standard deviation $\sigma$ ($T_{ij} = \exp{-(i-j)^2/2\sigma^2}$) or a window function of width W ($T_{ij} = 1/2W$ for $|i-j| < W$, otherwise 0). In general the measured transfer function of a spectrometer, for example, used to acquire the image would be used to define the $T_{ij}$ matrix. Objects consisting of Gaussian features were convolved to produce blurred images to which computer generated white noise was added. The resulting image defined the $I_j$'s i.e., the inputs to the constraint nodes which were all given the same gain, K. The reconstruction was given the same number of pixels as the blurred image, i.e., $N_s = N_c$, although this is not a requirement. The net was allowed to evolve until a steady state was reached. A time period equivalent to some 5 times the RC time constant of the signal nodes proved sufficient for the simulation to stabilize.

The state of no prior knowledge of the output was assumed by setting the $M_i$'s to be equal. A particular advantage of the entropy expression (2) is the $\Sigma O_i = 1$ is not required. The maximization of (2) and meeting the constraints cause the outputs from the net to be normalized to $EM_i$. This is particularly useful in a real circuit as the voltage levels can then be adjusted to be of a convenient level in terms of the maximum voltage output available and the electronic noise in the circuit.

The data in FIG. 4(a) consists of four Gaussians blurred by a Gaussian convolution function, the parameter of which are given in FIG. 4(b). The data have a small noise content and, although the noise is virtually invisible to the eye, it is sufficient to prevent a successful deconvolution using a discrete Fourier transform. The role of the entropy maximization can be seen in the slight rounding of the peaks in the reconstruction. The accuracy of the reconstruction in this low noise deconvolution could be improved by increasing the weight (K) given to the constraint term in the net cost function. In fact, the blurred data and reconstruction of FIG. 4(a) was run with a lower than optimum K to illustrate the action of the entropy regularizer. With a much greater than optimum K, the regularizer is removed and the method generates a least squares solution subject to positivity. Typically these are very irregular, consisting of individual pixels with finite counts separated by pixels with close to zero counts.

By way of comment, the net has the property of separating temporally the minimization of the constraint term and maximization of the entropy term in its cost function. This is apparent from the equation for $dE/dt$ in (8). Due to the log term on the right side of (8) the entropy is driven slower than the constraint term. So when the deconvolution starts, the constraint term is rapidly minimized whilst the entropy maximization is slower. This is illustrated in FIG. 5 where the time evolution of the Lyapunov function and its component parts (constraint and entropy terms) are shown for a similar deconvolution to that in FIG. 4. Initially the entropy decreases as the output becomes sharper and the constraints become more closely satisfied. The net then maximizes the entropy at the expense of a slight increase in the constraint term.

EXAMPLE 2

Figure 6A:
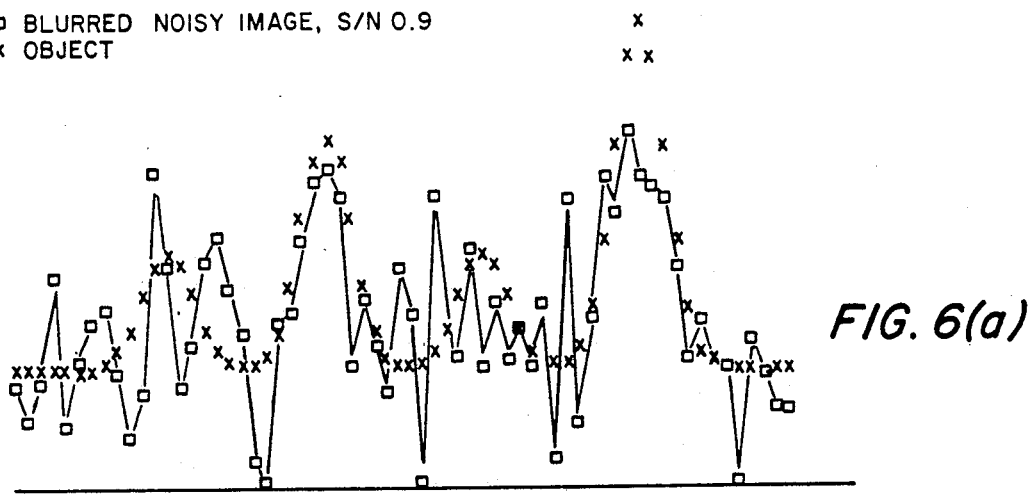
FIGS. 6(a) is a graph similar to that of FIG. 4, but showing the data more heavily blurred by noise.
Figure 6B:
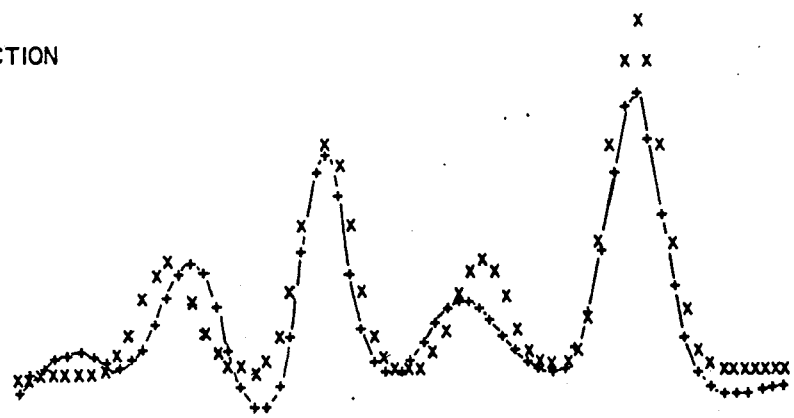
FIG. 6(b) shows a reconstruction of the data by the simulated net.
Figure 7:
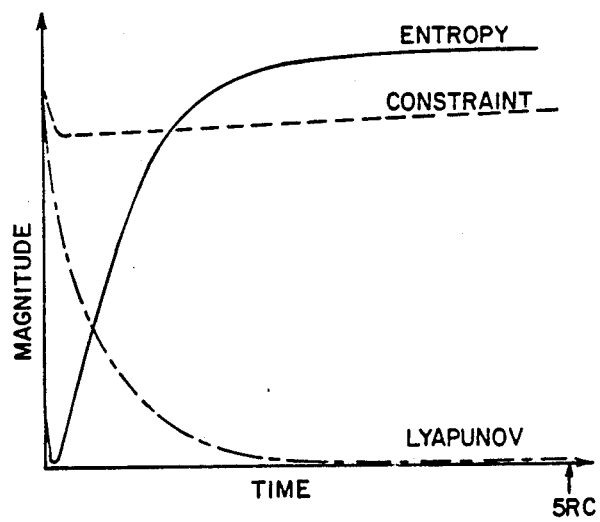
FIG. 7 is a graph similar to that of FIG. 5, showing the evolution of the terms of the stability function of the deconvolution of FIGS. 6(a) and 6(b).

Another such computer simulation was run using the same blurred image of FIG. 4, with white noise added to it giving a rms signal to rms noise ratio of 0.9. These data, and the net's reconstruction of them, are shown in FIGS. 6(a) and 6(b). As can be seen the reconstruction has successfully ascertained the presence of the four peaks. It should be emphasized that the amount of noise in FIG. 6 is very high and sufficient to "fool" the simulation as to the position of a peak, i.e., the noise can be form spurious peaks. In such cases even an "eyeballed" best fit would make the same mistake. In the absence of prior knowledge of the reconstruction, a real peak and a noise generated spurious signal are indistinguishable. Although it is unlikely that a real peak would be simulated by a random noise process, there is a finite chance one could be. Some of the simulation parameters are given in FIG. 4(b). The constraint node gain was reduced for the noisy deconvolution as discussed in the following section. The importance of the entropy regularizer when the image is very noisy is illustrated by FIG. 7, which shows the time evolution of the Lyapunov function for the reconstruction of FIG. 6.

EXAMPLE 3

Figure 8:
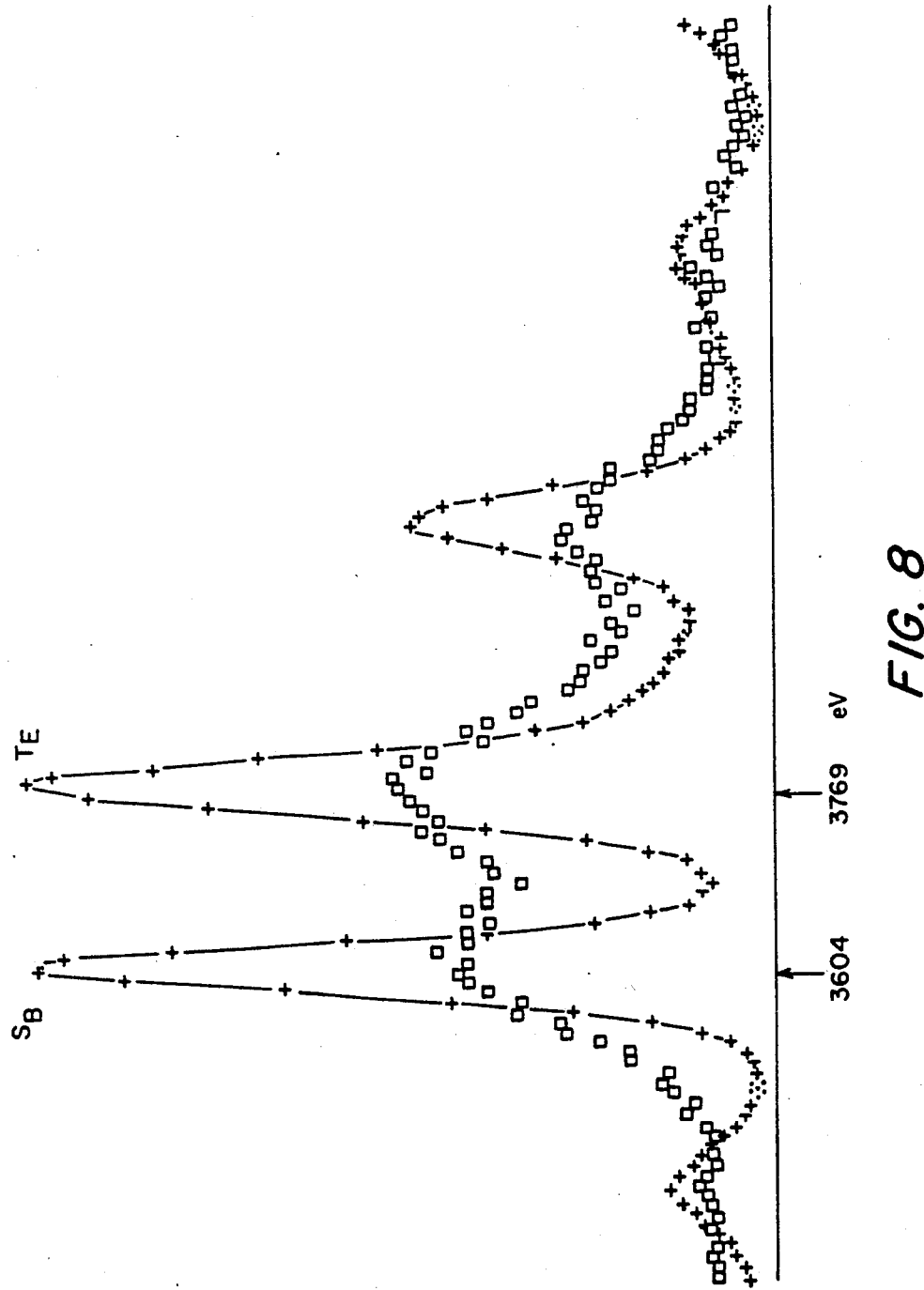
FIG. 8 is a graph of a corrupted x-ray fluorescence spectrum of an antimony-tellurium-alloy of unknown proportions, and the reconstruction of the spectrum by this invention using a uniform distribution for the prior estimate of the data.
Figure 9:
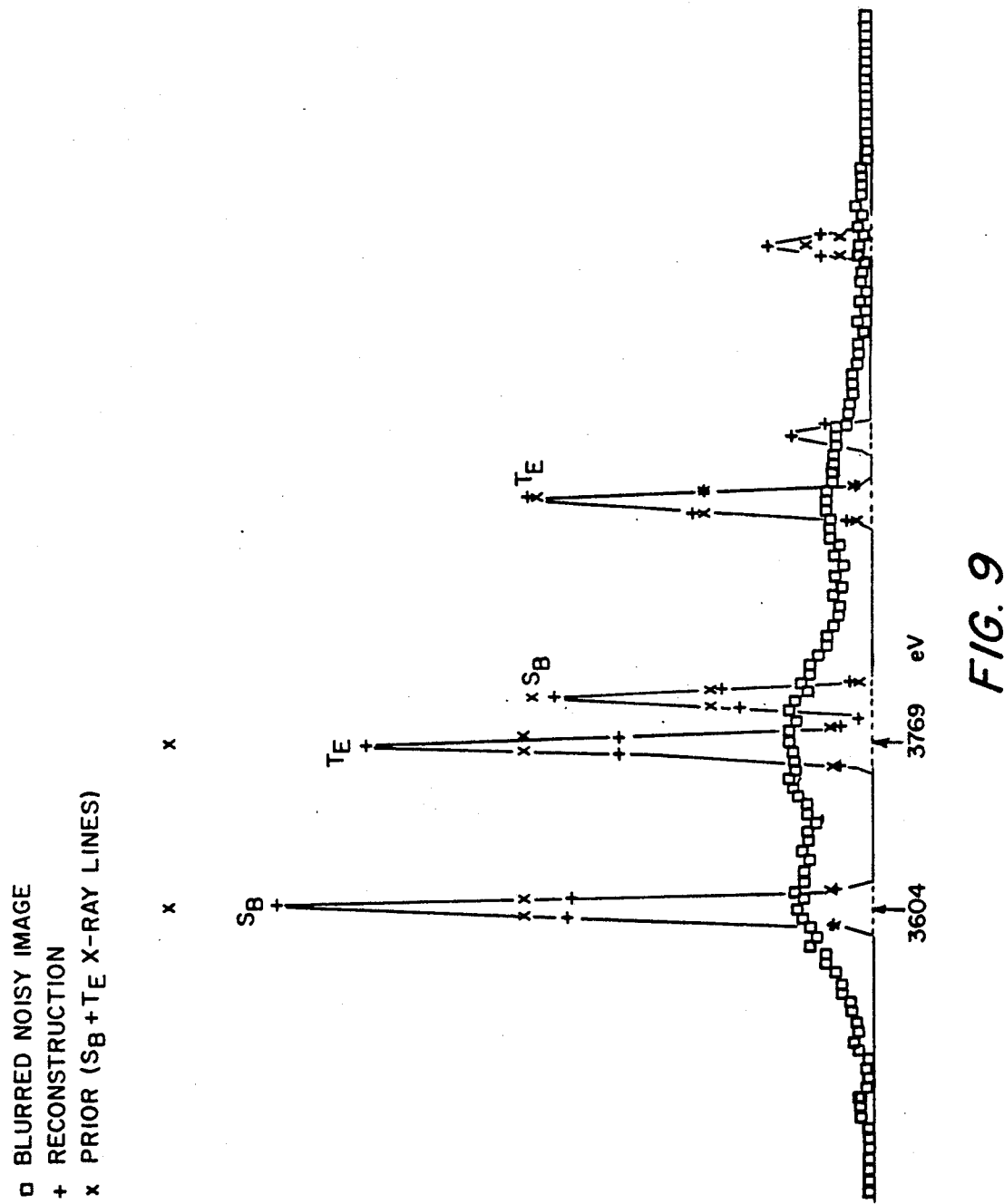
FIG. 9 is a graph of a reconstruction of the data of FIG. 8, using known spectral lines of antimony and tellurium as the prior estimate of the data.

Another such computer simulation was performed, using data generated by an x-ray fluorescence spectrometer. The results are presented in FIG. 8. The blurred, noisy, data was that of an x-ray spectrograph of a antimony-tellurium alloy of unknown proportions, and the prior estimate was a uniform distribution. The values of $T_{ij}$ were defined from measurements of the actual convolution function of the spectrometer used to take the spectrum.

EXAMPLE 4

Another such computer simulation was run using the same data as for Example 3, but using the known x-ray spectral lines for tellurium and antimony to form the prior estimates. Note that the satellite antimony line near the main tellurium line is resolved, and the main antimony line is now significantly larger than the main tellurium line. Note also the marked improvement in the reconstruction, compared to that of example 3, because of the better prior knowledge used to generate the cross entropy regularizer.

DISCUSSION

In the noisy data deconvolution problem, we require that the constraints be minimized rather than completely satisfied. To achieve this the constraint node gains are reduced and the entropy is given a greater weight in the cost function. however, there is no generally accepted maximum entropy-like solution when the constraints are soft. Indeed this point is the subject of some debate in the field of maximum entropy and Bayesian methods in statistics.

As mentioned in above what we have called the constraint term in the net's cost function is proportional to the logarithm of the likelihood function, L, of the output $O_i$ if the noise distribution is Gaussian. Thus the net output can be described as the distribution which maximizes the weighted sum of informational entropy and log(L). This is analogous to a maximum entropy approach to the problem of soft constraints. The problem of determining the relative weight has been approached semiempirically by keeping $K\sigma_n$, where $\sigma_n$ is the standard deviation of the noise distribution, constant as the noise level was varied. This approach has proved to be extremely successful in practice and seems reasonable in view of the expected precision possible when the data are corrupted by noise.

In high noise conditions, the optimum reconstruction strategy requires prior knowledge of the object to be reconstructed. The method allows for easy introduction of such specific prior knowledge through the parameters $M_i$. As these are introduced as external inputs to the circuit, no internal modification of the circuit is necessary.

The only instances of instability were observed when the gain of the constraint nodes was increased without decreasing the speed of the signal nodes. A similar observation has been made on actual circuits of this type. Empirical observations indicate that the this type of circuit can be stabilized with a suitable choice of constraint node gain K and capacitor C. As K is increased, C must be increased and the net requires longer to stabilize. As a result problems with soft constraints (such as deconvolutions of noisy data) can be solved faster. Relaxation times of 10 $\mu$s under nonoptimized conditions have been observed.

The method discussed here has a number of features which will ease implementation on an circuit. The main interconnects, the $T_{ij}$'s, are defined by the problem at hand, e.g., the system transfer function which can be well characterized. So, for a given system, the interconnects will be fixed and a adaptive circuit with a learning process is not necessary. In addition, the net for a deconvolution problem will in practice be only locally interconnected as the blurring will typically be of short range and extend over a few adjacent nodes, i.e., $T_{ij}$ approximately equal to O for i much greater than j and j much greater than i.

ADDITIONAL APPLICATION OF THE INVENTION

Figure 10:
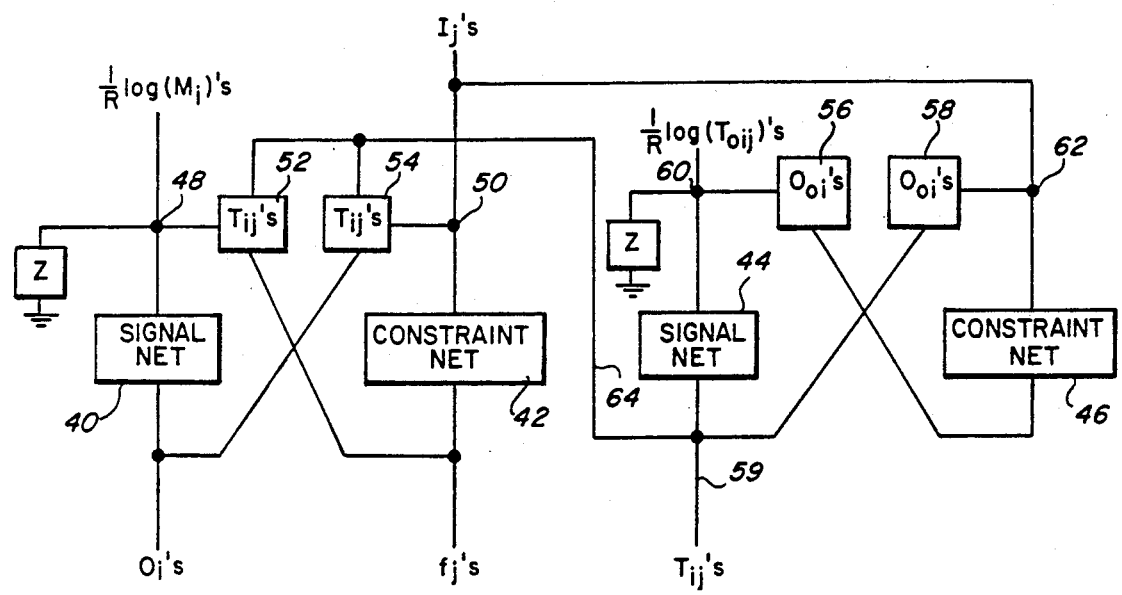
FIG. 10 is a block diagram showing of how the invention can be used to estimate time varying system transfer functions.

Another useful application of the invention derives from the associative nature of the convolution process, i.e. that O*T=T*O, where, again, T is the transfer function of a physical system, and O is the input to the system, the response to which is I. This suggests that one could as readily use the circuit of FIG. 3 to estimate transfer function T from I, O, and prior knowledge of T, as one can estimate O from I, T, and prior knowledge of O. FIG. 10 shows a block diagram of a circuit to do both these tasks.

The circuit uses two pairs of neural nets, each pair constituting one circuit net of the kind shown in FIG. 3. The first pair of nets has signal net 40 and constraint net 42, the second has signal net 44, and constraint net 46. The first pair receives at node 48 the cross entropy of data set O and its prior estimate M, receives corrupted data set I at node 50, and has interconnect strengths $T_{ij}$. Shunt impedance Z of node 48 (and of node 60) has real portion R, as in the embodiment of FIG. 3. As in the embodiment of FIG. 3, having R identical in all legs of all nets is preferred because doing so simplifies the mathematical analysis of the nets considerably.

The second net is structured identical to the first, having signal net 44 and constraint net 46, with feedback interconnects 56 and 58 to input nodes 60, 62. The interconnect strengths of 56, 58 are set to the values of the data set $O_o$. The term $O_o$ is here used to indicate a known calibration signal, the elements of which are $O_{oi}$, $i=1$ to $N_s$, which is used to identify an initial transfer function $T_o$, the elements of which are $T_{oij}$.

In operation, one uses the data set $O_o$ to characterize an initial transfer function $T_o$, and interconnects 56, 58 the values of the $O_{oi}$'s. The $T_{oij}$'s are input to signal net 44 at 60 to provide a cross entropy regularizer for nets 44, 46. Corrupted data I set enters at node 62, and nets 44 and 46 process these data in the manner of the circuit of FIG. 3. Because interconnects 56, 58 represent a known calibration input to the physical system, output 59 of signal net 44 represents the best estimate of the system's transfer function T as it has evolved overtime. The update interconnect strengths 52, 54. In the manner, net pair 44, 46 continuously updates the interconnect strengths 52, 54 between net pairs 40, 42. One can further improve the circuit's operation by periodically using a signal in the form of the $O_{oi}$'s to recalibrate the $T_{oij}$'s.

The invention is shown in what is considered to be the most practical and preferred embodiments, and is done so for purposes of illustration rather than limitation. Obvious modifications within the scope of the invention may occur to those skilled in this art. Accordingly, the scope of the invention is to be discerned solely by reference to the appended claims, wherein:

What is claimed and desired to be secured by Letters Patent of the United States:

1. A neural net comprising:
   a signal net and a constraint net; wherein
   said signal net comprises:
   a plurality $N_s$ of signal net legs, said signal net legs being numbered, respectively, from $i=1$ to $N_s$;
   each of said signal net legs comprises an exponential amplifier of transfer function g;
   the output of the ith of said signal net legs is $O_i$; and
   wherein said constraint net comprises:
   a plurality $N_c$ of constraint net legs, said constraint net legs being numbered, respectively, from $j=1$ to $N_c$;
   each of said constraint net legs comprising an amplifier of gain K;
   the input of each of said signal net legs has a shunt impedance having a real component R,
   wherein said neural net comprises feedback means for causing the output of the jth of said constraint net legs to be fed to the input of the ith of said signal net legs via a series transconductance $-T_{ij}$, and for causing $O_i$ to be fed to the input of the jth of said constraint net legs via series transconductance $T_{ij}$; and wherein said neural net further comprises means for causing an input to the ith of said signal net legs to be $(1/R)\log(M_i)$, $M_i$ being the ith element of a preselected data set.

2. A neural net circuit of the Tank-Hopfield kind, wherein said circuit comprises means for causing the stability function E of said circuit to be:

$$E = (K/2)\Sigma_j(\Sigma_i O_i T_{ij} - I_j)^2 + (1/R)\Sigma_i[O_i\log(O_i/M_i) - O_i]$$

where $M_i$ is the ith element of a preselected data set of $N_s$ members, $i = 1$ to $N_s$, $O_i$ is the output of the ith leg of the signal net of said circuit, $I_j$ is the input to the jth leg of the constraint net of said circuit, K is the gain of each said leg of said constraint net, $T_{ij}$ is the interconnect strength between the ith leg of said signal net and the jth leg of said constraint net, and R is the real part of the input shunt impedance of each of said signal net legs.

3. A circuit of the Tank-Hopfield kind, wherein:
the signal net of said circuit comprises a plurality $N_s$ of circuit legs, each of said circuit legs having an exponential transfer function g, and
wherein said circuit comprises means for causing the input of the ith of said circuit legs to be $(1/R)\log(M_i)$, where $i = 1$ to $N_s$, $M_i$ is the ith element of a preselected data set M having $N_s$ elements, each $M_i$ is selected to be a prior estimate of a signal $O_i$, and R is the real portion of the input shunt impedance for each of said legs.

4. A method of deconvolving a data set $I_j$ having noise corruption, $j = 1$ to N using circuit of the Tank-Hopfield kind, wherein:
the signal net of said circuit comprises a plurality $N_s$ of circuit legs, called signal legs,
the constraint net of said circuit comprises a plurality $N_c$ of circuit legs called constraint legs
wherein said method comprises steps for:
causing the transfer function g of each of said signal legs to be exponential; and
imputting to the ith of said circuit legs a signal $(1/R)\log(M_i)$, where $i = 1$ to $N_s$, $M_i$ is the ith element of a preselected data set M having $N_s$ elements, and R is the real portion of the input shunt impedance for each of said legs.

5. The method of claim 4, further comprising using the outputs of said constraint legs to estimate said noise corruption.

* * * * *